(12) United States Patent
Fujita et al.

(10) Patent No.: US 6,900,883 B2
(45) Date of Patent: May 31, 2005

(54) WAVELENGTH DEPENDENCE MEASURING SYSTEM

(75) Inventors: Kiyohisa Fujita, Hamamatsu (JP); Nobuaki Ema, Hamamatsu (JP)

(73) Assignee: Ando Electric Co., Ltd., Tokyo (JP)

( * ) Notice: Subject to any disclaimer, the term of this patent is extended or adjusted under 35 U.S.C. 154(b) by 42 days.

(21) Appl. No.: 10/378,353

(22) Filed: Mar. 3, 2003

(65) Prior Publication Data

US 2003/0164940 A1 Sep. 4, 2003

(30) Foreign Application Priority Data

Mar. 4, 2002 (JP) .................................... P.2002-057806

(51) Int. Cl.[7] .............................................. G01N 21/00
(52) U.S. Cl. .................................................. 356/73.1
(58) Field of Search ..................... 356/73.1; 385/32–39, 385/12–24, 123, 136; 250/227.11, 227.14, 227.22, 227.18; 359/115–127

(56) References Cited

U.S. PATENT DOCUMENTS

| | | | |
|---|---|---|---|
| 5,323,224 A | * | 6/1994 | Wada ......................... 356/73.1 |
| 5,991,479 A | * | 11/1999 | Kleinerman .................. 385/31 |
| 2002/0196426 A1 | * | 12/2002 | Stolte ......................... 356/73.1 |
| 2003/0160951 A1 | * | 8/2003 | Babin et al. ................ 356/73.1 |

FOREIGN PATENT DOCUMENTS

| | | |
|---|---|---|
| EP | 0 548 935 | 6/1993 |
| EP | 0 859 477 | 8/1998 |
| EP | 0 905 490 | 3/1999 |
| EP | 1 099 943 | 5/2001 |

OTHER PUBLICATIONS

European Search Report.

* cited by examiner

Primary Examiner—Tu T. Nguyen
(74) Attorney, Agent, or Firm—Fish & Richardson P.C.

(57) ABSTRACT

A swept-wavelength loss measuring system is provided with an arrangement including a tunable laser source that outputs light to a DUT with the wavelength being continuously varied, and outputs measuring trigger signals at arbitrary intervals, at least one optical power meter for measuring an intensity of light transmitted through the DUT in response to reception of each of the measuring trigger signals, a wavelength measuring unit for measuring a wavelength of the outputted light from the tunable laser source in response to reception of each of the measuring trigger signals, and an arithmetic operation unit carrying out an arithmetic operation of the outputs from the optical power meter and the wavelength measuring unit to output a light intensity value relative to each wavelength. The arrangement assures accuracy of the measured wavelength.

15 Claims, 2 Drawing Sheets

WAVELENGTH DEPENDENCE MEASURING SYSTEM

BACKGROUND OF THE INVENTION

1. Field of the Invention

The present invention relates to a wavelength dependence (swept-wavelength loss) measuring system for measuring a swept-wavelength loss of an optical element such as an optical fiber as a Device Under Test(DUT).

2. Description of the Related Art

There have been two types of swept-wavelength loss measuring system combined with a tunable laser source and an optical power meter, i.e. a system with a stepwise sweeping wavelength measuring method and a system with a continuous sweeping wavelength measuring method.

The stepwise sweeping wavelength measuring method is a method by which a wavelength of an outputted light of a tunable laser source is made stepwise varied, the wavelength of the outputted light is ascertained by monitoring the wavelength with a wavelength meter each time the wavelength is stepwise varied, and intensity of the light transmitted through the DUT is measured with an optical power meter.

The continuous sweeping wavelength measuring method is a method by which a wavelength of an outputted light of the tunable laser source is made continuously varied, at the same time, measuring trigger signals are made outputted at a certain fixed interval, and each time the measuring trigger signal is outputted, intensity of the light transmitted through the DUT is measured with the optical power meter.

The measuring trigger signals are outputted at positions determined beforehand at specified intervals on a movable part in a tunable laser mechanism (for example, a movable part of a motor) of the tunable laser source. With the position on the movable part made related to the wavelength of the outputted light beforehand, the position on the movable part can be expressed in terms of the wavelength to allow the positional information of the movable part to be easily outputted as wavelength information.

Moreover, the measuring trigger signal can be also generated with the outputted light from the tunable laser source split and made incident on a wavelength dependent device such as an etalon (cf. JP-A-11-2587).

The continuous sweeping wavelength measuring method, due to a measuring principle thereof different from that of the stepwise sweeping wavelength measuring method, can carry out a significantly faster measurement compared with the measurement with the stepwise sweeping wavelength measuring method to be becoming a dominant method for the swept-wavelength loss measurement.

Next, an explanation will be made about a principle of the swept-wavelength loss measurement with a related continuous sweeping wavelength measuring method by using FIG. 2.

In FIG. 2, reference numeral 1 denotes an example of a swept-wavelength loss measuring system with the continuous sweeping wavelength measuring method. The system 1 includes a tunable laser source 2, an optical power meter 3, a displaying arithmetic operation unit 4 and a displaying unit 5.

The tunable laser source 2 includes a tunable laser section 2—2 and a measuring trigger signal generating section 2-1.

Reference numeral 6 denotes a DUT to which the outputted light from the tunable laser source 2 is inputted, and the light transmitted through the object 6 is outputted to the optical power meter 3.

The tunable laser source 2 has an arrangement in which a wavelength of outputted light of the tunable laser section 2—2 is made continuously varied, and at the same time, a measuring trigger signals are outputted to the optical power meter 3 at fixed intervals.

The outputted light from the tunable laser section 2—2 transmits through the DUT 6 to be given to the optical power meter 3 as light to be measured. At the optical power meter 3, an intensity of the light is measured with timing at which the measuring trigger signal is outputted.

Intensity information of the light measured at the optical power meter 3 is inputted to the displaying arithmetic operation unit 4 together with wavelength information of the outputted light converted at the measuring trigger signal generating section 2-1. Both kinds of information are processed at the displaying arithmetic operation unit 4, by a processed output of which a graph is displayed at the displaying unit 5 about an intensity corresponding to a wavelength of the outputted light.

In FIG. 3, there is shown an example of results of swept-wavelength loss measurement obtained by the related swept-wavelength loss measuring system.

In FIG. 3, a horizontal axis represents a wavelength and a vertical axis represents an intensity for graphically presenting the intensity as being plotted against each measured wavelength.

In the swept-wavelength loss measuring system shown in FIG. 2, the measured results as shown in FIG. 3 were obtained on the assumption that the measuring trigger signals provided for measurement are outputted at fixed wavelength intervals over the whole measuring range.

In the graph shown in FIG. 3, the wavelength is shown on the horizontal axis. The wavelength shown here, however, does not represent a directly measured wavelength value of the outputted light, but a value obtained in terms of a position of a movable part in a tunable laser mechanism (for example, a movable part of a motor) of the tunable laser source with the position on the movable part having been made related to the wavelength of the outputted light beforehand.

Therefore, in a related swept-wavelength loss measuring system, no actual wavelength while being swept is measured. Thus, an accuracy of the wavelength presented on the horizontal axis was not necessarily assured.

Namely, in the related continuous sweeping wavelength measuring method, no real time wavelength measurement was carried out with a wavelength of the outputted light being continuous varied. This certainly presents an unsteady factor of some kind between the measuring trigger signal and the actually outputted wavelength information of the outputted light, which affects the accuracy of the wavelength value obtained in the measuring system.

In order to reduce such an unsteady factor, efforts have long been concentrated on "How to accurately output the measuring trigger signal".

Nevertheless, however accurately the measuring trigger signal was outputted, incapability of measuring a wavelength in being swept still caused a problem in that the accuracy of the obtained wavelength corresponding to the measuring trigger signal was merely based on an assumption from an accuracy of a wavelength measured when the sweeping was made stopped.

It is an object of the invention to enhance and assure an accuracy of a wavelength obtained in a swept-wavelength loss measuring system, for which, by using a measuring trigger signal in a continuous sweeping wavelength measuring method, an intensity of light transmitted through a DUT is measured by a photodetector such as an optical power meter, and at the same time, a wavelength of an outputted light from a tunable laser source is measured in synchronous with the measuring trigger signal, thereby relating the intensity of the transmitted light to the wavelength of the outputted light being swept.

SUMMARY OF THE INVENTION

In order to achieve the above object, the swept-wavelength loss measuring system according to the invention includes:

- a tunable laser source outputting light with a wavelength thereof being continuously varied, and along with this, outputting measuring trigger signals at arbitrary intervals, a part of the outputted light being made inputted to a DUT;
- a light intensity measuring unit having at least one photodetector disposed for receiving light transmitted through the DUT, and being connected to the tunable laser source, the unit measuring an intensity of the received light with the at least one photodetector in response to reception of each of the measuring trigger signals from the tunable laser source, and outputting the intensity information;
- a wavelength measuring unit disposed for receiving the rest part of the outputted light from the tunable laser source and connected to the tunable laser source, the unit measuring a wavelength of the outputted light from the tunable laser source in response to reception of each of the measuring trigger signals, and outputting wavelength information; and
- an arithmetic operation unit connected to the light intensity measuring unit and the wavelength measuring unit, the unit receiving the light intensity information and the wavelength information outputted from the light intensity measuring unit and the wavelength measuring unit, respectively, carrying out an arithmetic operation of the light intensity information and the wavelength information, and outputting a light intensity value relative to each wavelength.

The swept-wavelength loss measuring system further includes a light splitting unit disposed on a light path of the outputted light from the tunable laser source for splitting the light outputted from the tunable laser source, one of the split light being made outputted to the DUT as a part of the outputted light, and at the same time, the other of the split light being outputted to the wavelength measuring unit as the rest part of the outputted light.

Moreover, as the wavelength measuring unit, there is used a wavelength dependent device of a filter type, an etalon type or a Michelson type wavelength measuring device.

Furthermore, the wavelength measuring unit carries out actual measurement of wavelength and storage of the measured data separately from an arithmetic operation of wavelength data for displaying results of measurement.

Processing of the arithmetic operation of wavelength data for displaying the results of measurement is carried out about a part of all of specified wavelength measuring points, and about the rest of the specified wavelength measuring points, the wavelength data are obtained by interpolating values of the wavelength data obtained by the arithmetic operation carried out about a part of all of the specified wavelength measuring points.

Moreover, the measuring trigger signals inputted to the wavelength measuring unit are thinned out at arbitrary intervals, and wavelength data corresponding to the thinned out measuring trigger signals are obtained by interpolating wavelength data actually obtained.

Furthermore, an arrangement is provided in which the measuring trigger signals are outputted at intervals determined differently to the wavelength variation intervals of the light outputted from the tunable laser source.

DESCRIPTION OF THE PREFERRED EMBODIMENT

In the following, an explanation will be made by using FIG. 1 about a principle of the swept-wavelength loss measurement with a continuous sweeping wavelength measuring method employed in the swept-wavelength loss measuring system according to the invention.

Figure 1:
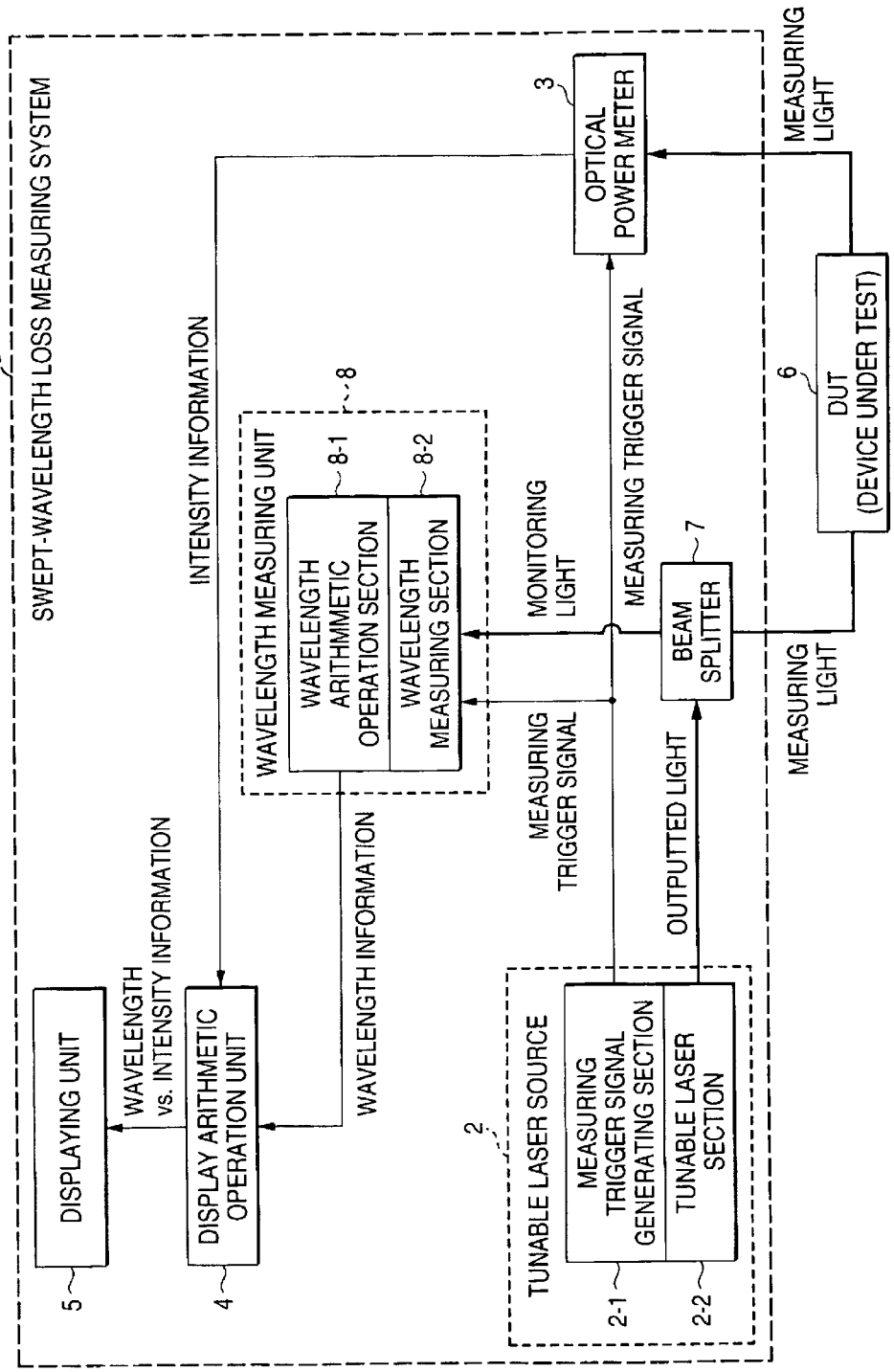
FIG. 1 is a block diagram showing an arrangement of an embodiment of a swept-wavelength loss measuring system according to the invention.

FIG. 1 is a block diagram showing an arrangement of an embodiment of a swept-wavelength loss measuring system according to the invention. Reference numeral 1 denotes a swept-wavelength loss measuring system 1 which includes a tunable laser source 2, an optical power meter 3, a displaying arithmetic operation unit 4, a displaying unit 5, a beam splitter 7 and a wavelength measuring unit 8.

The tunable laser source 2 includes a tunable laser section 2—2 and a measuring trigger signal generating section 2-1, and the wavelength measuring unit 8 includes a wavelength measuring section 8-1 and a wavelength arithmetic operation section 8-2.

Moreover, reference numeral 6 denotes a DUT to which outputted light from the tunable laser source 2 is inputted as measuring light and is outputted to the optical power meter 3.

Figure 2:
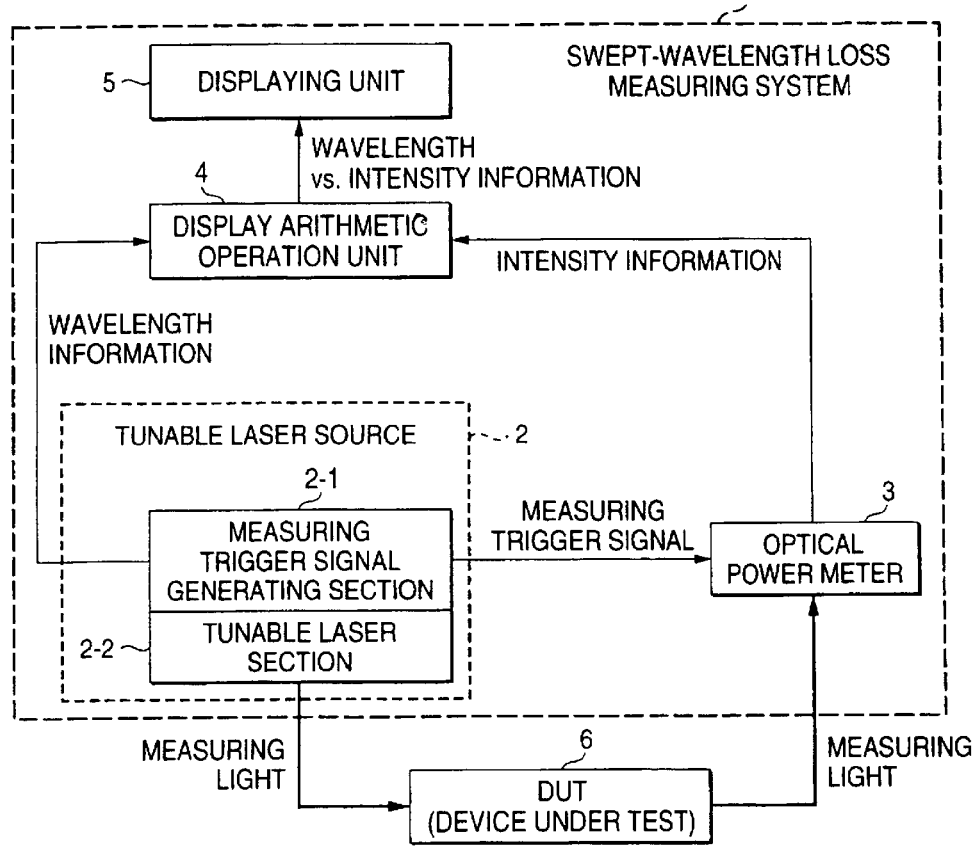
FIG. 2 is a block diagram showing an arrangement of an example of a swept-wavelength loss measuring system according to related art.

In the swept-wavelength loss measuring system 1 shown in FIG. 1, light outputted from the tunable laser section 2—2, the wavelength of which light is continuously varied, is split into two by the beam splitter 7. One of the split outputted light is made transmitted through the DUT 6 as a measuring light and the transmitted measuring light is given to the optical power meter 3. At the optical power meter 3, an intensity of the measuring light is measured with timing at which the measuring trigger signal is outputted (the operation is the same as that in the related swept-wavelength loss measuring system shown in FIG. 2).

Moreover, the other split outputted light from the beam splitter 7 is given to the wavelength measuring section 8-1, making up the wavelength measuring unit 8, together with a measuring trigger signal generated at the measuring trigger signal generating section 2-1.

As explained above, in the swept-wavelength loss measuring system according to the invention, an intensity of the measuring light (transmitted light from the DUT) is measured at the optical power meter 3 with timing at which the measuring trigger signal is outputted. At the same time, at the same timing of the measuring trigger signal, the wavelength of the outputted light from the tunable laser section 2—2 is measured. The measured result is processed at the displaying arithmetic operation unit 4.

Figure 3:
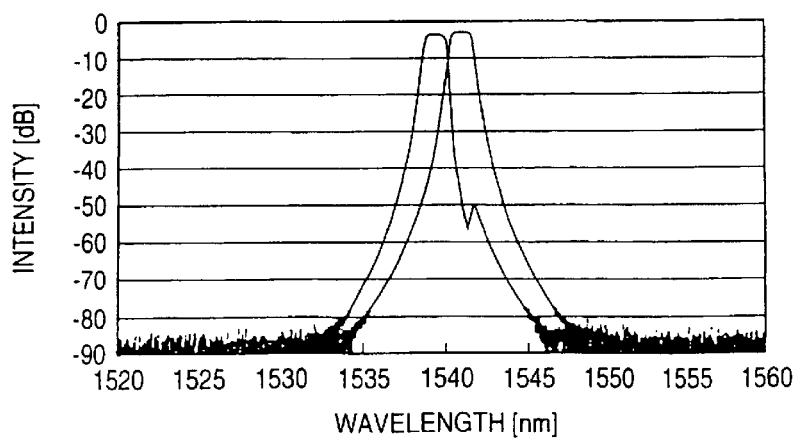
FIG. 3 is a view showing an example of results of swept-wavelength loss measurement obtained by the swept-wavelength loss measuring system according to related art.

In this way, with the wavelength of an outputted light measured by the wavelength measuring unit 8 and the intensity of light transmitted through the DUT are made related to each other, a graph as shown in FIG. 3, in which wavelength accuracy is assured, can be displayed on the displaying unit 5.

Examples of application of the embodiment according to the invention shown in FIG. 1 are presented in the following:

a. By correcting intensity data having been already obtained on the basis of measured value of wavelength, intensity data relative to wavelength are obtained at desired wavelength variation intervals.

b. During the measurement, only actually measured data, obtained at the wavelength measuring section 8-1 in the wavelength measuring unit 8, are stored in a storage not shown and, after the measurement, wavelength values at all the measuring points are calculated out at the wavelength arithmetic operation section 8-2 and the displaying arithmetic operation unit 4, thereby speeding up the swept-wavelength loss measurement.

c. Measuring points of wavelengths for the arithmetic operation are taken to be less than all of the specified measuring points to carry out arithmetic operation for interpolation about the omitted points at the displaying arithmetic operation unit 4, thereby speeding up the swept-wavelength loss measurement.

d. The measuring trigger signals inputted to the wavelength measuring unit 8 is thinned out to reduce the number of all of the measuring points, and arithmetic operations for interpolation are carried out about the thinned out points at the displaying arithmetic operation unit 4, thereby speeding up the swept-wavelength loss measurement. In this case, however, what is thinned out is the wavelength measurement, and no intensity measurement is thinned out at the optical power meter 3.

e. The measuring trigger signals are outputted at intervals unrelated to the wavelength variation intervals of the light outputted from the tunable laser source (for example, at fixed time intervals).

In measuring swept-wavelength loss as shown in FIG. 3, in a wavelength region between 1530 nm and 1550 nm, for example, by outputting the measuring trigger signals at wavelength variation intervals finer than intervals in the other regions, more precise measurement can be also made possible.

The characteristic about the measuring operation of the swept-wavelength loss measuring system according to the invention, in which a wavelength is measured at every measuring trigger signal, is compared with that of a related swept-wavelength loss measuring system as follows.

In the related swept-wavelength loss measuring system, the measuring trigger signals and the outputted wavelengths were in a one to one correspondence, which was based on measured results obtained beforehand by the steps of:

1) setting the movable part at a desired position in the tunable laser source;

2) measuring an outputted wavelength at that time with a highly accurate wavelength meter; and 3) repeating the above steps 1) and 2) to obtain a relationship between the position of the movable part and the outputted wavelength.

The relationship obtained by the above steps, however, is strictly a relationship between a position of the movable part and the outputted wavelength when the movable part is at a standstill, and no relationship is shown about the position and an actually outputted wavelength when the movable part is in operation (sweeping).

Therefore, even though an accuracy in repeatability is excellent in the outputted wavelength obtained from the movable part being at standstill, an equivalent accuracy cannot be assured for a wavelength obtained from the movable part in sweeping.

Compared with this, in the swept-wavelength loss measuring system according to the invention in which a wavelength is measured at every measuring trigger signal, the measuring trigger signal is for relating an outputted wavelength to an intensity value measured at the optical power meter of an intensity. Thus, it is strictly the wavelength measuring unit that determines the accuracy of the measured wavelength.

The wavelength measuring unit 8, on condition that a variation in swept wavelength of an inputted light is sufficiently small in the actual measuring time of the unit, can output the same measured result for the same wavelength whether the sweeping is in operation or in being stopped.

Therefore, the calibration of the wavelength measuring unit can be carried out with the sweeping being stopped. Namely, the wavelength measuring unit, calibrated with a high accuracy wavelength meter spending a long measuring time, can assure the accuracy without degradation even though the wavelength measurement is carried out with the sweeping being in operation.

As a result, accuracy of the measured wavelength, assured by the results of measurement with the swept-wavelength loss measuring system according to the invention, only depends on errors presented in the wavelength measuring unit 8. The errors, however, can be checked by a high accuracy wavelength meter and evaluated, thereby being definitely presented According to the first aspect of the invention, there is provided a swept-wavelength loss measuring system with an arrangement including:

a tunable laser source outputting light with a wavelength thereof being continuously varied, and along with this, outputting measuring trigger signals at arbitrary intervals, a part of the outputted light being made inputted to a DUT;

a light intensity measuring unit having at least one photodetector disposed for receiving light transmitted through the DUT, and being connected to the tunable laser source, the unit measuring an intensity of the received light with the at least one photodetector in response to reception of each of the measuring trigger signals from the tunable laser source, and outputting the intensity information;

a wavelength measuring unit disposed for receiving the rest part of the outputted light from the tunable laser source and connected to the tunable laser source, the unit measuring a wavelength of the outputted light from the tunable laser source in response to reception of each of the measuring trigger signals, and outputting wavelength information; and an arithmetic operation unit connected to the light intensity measuring unit and the wavelength measuring unit, the unit receiving the light intensity information and the wavelength information outputted from the light intensity measuring unit and the wavelength measuring unit, respectively, carrying out an arithmetic operation of the light intensity information and the wavelength information, and outputting a light intensity value relative to each wavelength.

The arrangement allows the calibration of the wavelength measuring unit to be carried out with the sweeping being stopped. Namely, the wavelength measuring unit, calibrated with a high accuracy wavelength meter spending a long measuring time, can assure the accuracy without degradation even though the wavelength measurement is carried out with the sweeping being in operation.

According to the second aspect of the invention, an arrangement is provided which includes a light splitting unit disposed on a light path of the outputted light from the tunable laser source for splitting the light outputted from the tunable laser source, one of the split light being made outputted to the DUT as a part of the outputted light, and at the same time, the other of the split light being outputted to the wavelength measuring unit as the rest part of the outputted light.

This makes it possible to carry out measurement of an intensity and a wavelength of the outputted light at the same wavelength measuring point.

Moreover, according to the third aspect of the invention, for the wavelength measuring unit, there can be used a wavelength dependent device such as a filter type, an etalon type or a Michelson type wavelength measuring device.

Furthermore, according to the fourth aspect of the invention, the wavelength measuring unit carries out actual measurement of wavelength and storage of the measured data separately from an arithmetic operation of wavelength data for displaying results of measurement. This makes it possible to speed up the measurement.

According to the fifth aspect of the invention, processing of the arithmetic operation of wavelength data for displaying the results of measurement is carried out about a part of all the specified wavelength measuring points, and about the rest of the specified wavelength measuring points, the wavelength data are obtained by interpolating values of the wavelength data obtained by the arithmetic operation carried out about a part of all the specified wavelength measuring points. This makes it possible to speed up the measurement.

According to the sixth aspect of the invention, the measuring trigger signals inputted to the wavelength measuring unit are thinned out at arbitrary intervals, and wavelength data corresponding to the thinned out measuring trigger signals are obtained by interpolating wavelength data actually obtained. This makes it possible to speed up the measurement.

In addition, according to the seventh aspect of the invention, an arrangement is provided in which the measuring trigger signals are outputted at intervals in a variation in a physical quantity independent of the wavelength variation intervals of the light outputted from the tunable laser source (for example, at fixed time intervals). This makes it possible to carry out measurement that matches characteristics of the DUT.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A swept-wavelength loss measuring system comprising:

a tunable laser source outputting light with a wavelength thereof being continuously varied, and along with this, outputting measuring trigger signals at arbitrary intervals, a part of the outputted light being inputted to a DUT;

a light intensity measuring unit having at least one photodetector disposed for receiving light transmitted through the DUT, and being connected to the tunable laser source, the light intensity measuring unit measuring an intensity of the received light with the at least one photodetector in response to reception of each of the measuring trigger signals from the tunable laser source, and outputting intensity information;

a wavelength measuring unit disposed for receiving the rest other part of the outputted light from the tunable laser source and connected to the tunable laser source, the wavelength measuring unit measuring a wavelength of the outputted light from the tunable laser source in response to reception of each of the measuring trigger signals, and outputting wavelength information; and an arithmetic operation unit connected to the light intensity measuring unit and the wavelength measuring unit, the arithmetic operation unit receiving the light intensity information and the wavelength information outputted from the light intensity measuring unit and the wavelength measuring unit, respectively, carrying out an arithmetic operation of the light intensity information and the wavelength information, and outputting a light intensity value relative to each wavelength.

2. The swept-wavelength loss measuring system as claimed in claim 1 further comprising a light splitting unit disposed on a light path of the outputted light from the tunable laser source for splitting the light outputted from the tunable laser source, one of the split light being made outputted to the DUT as a part of the outputted light, and at the same time, the other of the split light being outputted to the wavelength measuring unit as the other part of the outputted light.

3. The swept-wavelength loss measuring system as claimed in claim 1 or claim 2 wherein the wavelength measuring unit is a wavelength dependent device of one of a filter type, an etalon type and a Michelson type wavelength measuring device.

4. The swept-wavelength loss measuring system as claimed in claim 1 or claim 2 wherein the wavelength measuring unit carries out actual measurement of wavelength and storage of the measured data separately from an arithmetic operation of wavelength data for displaying results of measurement.

5. The swept-wavelength loss measuring system as claimed in claim 4 wherein processing of the arithmetic operation of wavelength data for displaying the results of measurement is carried out about a part of all specified wavelength measuring points, and about the rest of the specified wavelength measuring points, the wavelength data are obtained by interpolating values of the wavelength data obtained by the arithmetic operation carried out about the part of all the specified wavelength measuring points.

6. The swept-wavelength loss measuring system as claimed in claim 1 or claim 2 wherein the measuring trigger signals inputted to the wavelength measuring unit are thinned out at arbitrary intervals, and wavelength data corresponding to the thinned out measuring trigger signals are obtained by interpolating wavelength data actually obtained.

7. The swept-wavelength loss measuring system as claimed in claim 1 or claim 2 wherein the measuring trigger signals are outputted at intervals determined differently to the wavelength variation intervals of the light outputted from the tunable laser source.

8. The swept-wavelength loss measuring system as claimed in claim 3 wherein the wavelength measuring unit carries out actual measurement of wavelength and storage of the measured data separately from an arithmetic operation of wavelength data for displaying results of measurement.

9. The swept-wavelength loss measuring system as claimed in claim 8 wherein processing of the arithmetic operation of wavelength data for displaying the results of measurement is carried out about a part of all specified wavelength measuring points, and about the rest of the specified wavelength measuring points, the wavelength data are obtained by interpolating values of the wavelength data obtained by the arithmetic operation carried out about the part of all the specified wavelength measuring points.

10. The swept-wavelength loss measuring system as claimed in 9 wherein the measuring trigger signals inputted to the wavelength measuring unit are thinned out at arbitrary intervals, and wavelength data corresponding to the thinned out measuring trigger signals are obtained by interpolating wavelength data actually obtained.

11. The swept-wavelength loss measuring system as claimed in 8 wherein the measuring trigger signals inputted to the wavelength measuring unit are thinned out at arbitrary intervals, and wavelength data corresponding to the thinned out measuring trigger signals are obtained by interpolating wavelength data actually obtained.

12. The swept-wavelength loss measuring system as claimed in claim 8 wherein the measuring trigger signals are outputted at intervals determined differently to the wavelength variation intervals of the light outputted from the tunable laser source.

13. The swept-wavelength loss measuring system as claimed in claim 9 wherein the measuring trigger signals are outputted at intervals determined differently to the wavelength variation intervals of the light outputted from the tunable laser source.

14. The swept-wavelength loss measuring system as claimed in claim 10 wherein the measuring trigger signals are outputted at intervals determined differently to the wavelength variation intervals of the light outputted from the tunable laser source.

15. The swept-wavelength loss measuring system as claimed in claim 11 wherein the measuring trigger signals are outputted at intervals determined differently to the wavelength variation intervals of the light outputted from the tunable laser source.

\* \* \* \* \*